(12) United States Patent
Johnson et al.

(10) Patent No.: US 11,597,259 B2
(45) Date of Patent: Mar. 7, 2023

(54) IONIZED AIR DELIVERY SYSTEM

(71) Applicant: JAGUAR LAND ROVER LIMITED, Coventry (GB)

(72) Inventors: Richard Johnson, Tamworth (GB); Isabel Cope, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 36 days.

(21) Appl. No.: 16/078,994

(22) PCT Filed: Feb. 9, 2017

(86) PCT No.: PCT/EP2017/052868
§ 371 (c)(1),
(2) Date: Aug. 22, 2018

(87) PCT Pub. No.: WO2017/144284
PCT Pub. Date: Aug. 31, 2017

(65) Prior Publication Data
US 2019/0061480 A1     Feb. 28, 2019

(30) Foreign Application Priority Data
Feb. 22, 2016   (GB) ..................... 1602993

(51) Int. Cl.
*B60H 3/00* (2006.01)
*B60H 1/00* (2006.01)
(Continued)

(52) U.S. Cl.
CPC ....... *B60H 3/0071* (2013.01); *B60H 1/00564* (2013.01); *B60H 1/246* (2013.01);
(Continued)

(58) Field of Classification Search
CPC combination set(s) only.
See application file for complete search history.

(56) References Cited

U.S. PATENT DOCUMENTS

| 2,928,941 A | 3/1960 | Wesley et al. |
| 2006/0104858 A1* | 5/2006 | Potember ................ F24F 3/166 |
| | | 422/4 |

(Continued)

FOREIGN PATENT DOCUMENTS

| EP | 2301780 A1 | 3/2011 |
| JP | 08224433 A * | 9/1996 |

(Continued)

OTHER PUBLICATIONS

JP 2011007443 MT, Machine translation of JP 2011007443, to which WO 2010150770 has priority (Year: 2011).*

(Continued)

*Primary Examiner* — Steven S Anderson, II
(74) *Attorney, Agent, or Firm* — Reising Ethington P.C.

(57) ABSTRACT

An ionized air delivery system, such as a vehicle ionized air delivery system, includes an outlet body that is situated within a duct of a heating, ventilation, and air conditioning (HVAC) system. The outlet body delivers ions to air flow in the duct of the HVAC system. The outlet body has an outer surface that is generally spherical at a region of the outer surface that confronts the air flow in the duct. Further, the outlet body has an outlet passage with a primary axis that is directed away from an exit of the duct of the HVAC system. Air flow in the duct passes across an exit opening of the outlet body and draws ions out of the outlet passage to mix with the air flow in the duct of the HVAC system.

18 Claims, 5 Drawing Sheets

(51) Int. Cl.
  *B60H 1/24* (2006.01)
  *F24F 8/192* (2021.01)
  *H01T 23/00* (2006.01)
  *F24F 8/30* (2021.01)
(52) U.S. Cl.
  CPC .............. *F24F 8/192* (2021.01); *H01T 23/00* (2013.01); *F24F 8/30* (2021.01)

(56) References Cited

U.S. PATENT DOCUMENTS

| | | | | |
|---|---|---|---|---|
| 2007/0086142 | A1* | 4/2007 | Salisbury | H01T 19/04 361/212 |
| 2008/0292450 | A1* | 11/2008 | Yano | B60H 3/022 415/116 |
| 2009/0321544 | A1* | 12/2009 | Akisada | B05B 5/0255 239/704 |
| 2011/0073685 | A1 | 3/2011 | Yano et al. | |
| 2013/0161423 | A1 | 6/2013 | Yano | |

FOREIGN PATENT DOCUMENTS

| | | | | |
|---|---|---|---|---|
| JP | 2009127912 | A * | 6/2009 | |
| JP | 2012180017 | A | 9/2012 | |
| JP | 5415920 | B2 | 2/2014 | |
| WO | WO-2008050878 | A1 * | 5/2008 | ............ B60H 3/022 |
| WO | WO2010010289 | A1 | 1/2010 | |
| WO | WO2010150770 | A1 | 12/2010 | |

OTHER PUBLICATIONS

JPH08224433A_Description_202107091735; Machine translation of Sawada et al. (JPH08224433A) (Year: 1996).*
Oxford English Dictionary, circumscribed, Jun. 2018, accessed Jan. 20, 2022, https://www.oed.com/view/Entry/33352?rskey=k3mvU7&result=2&isAdvanced=false#eid (Year: 2018).*
Combined Search and Examination Report for application No. GB1602993.6, dated Sep. 19, 2016, 7 pages.
International Search Report for International application No. PCT/EP2017/052868, dated Feb. 9, 2017, 5 pages.
Written Opinion for International application No. PCT/EP2017/052868, dated dated Feb. 9, 2017, 7 pages.

* cited by examiner

IONIZED AIR DELIVERY SYSTEM

TECHNICAL FIELD

The present disclosure relates generally to an ionized air delivery system, and more particularly, but not exclusively, to an ionized air delivery system that delivers ions to air flow in a duct of a heating, ventilation, and air conditioning (HVAC) system over all blower speed settings. Aspects of the invention relate to a system, to a vehicle, and to a method.

BACKGROUND

Vehicles such as automobiles are sometimes equipped with air ionisation systems to deliver ions to passenger compartments. It is not uncommon for the air ionisation systems to be integrated into heating, ventilation, and air conditioning (HVAC) systems in the vehicles. Air ionisation has been shown to improved hygiene, remove odor, and furnish other gains. In a vehicle, one challenge encountered relates to the effectiveness of air ionisation systems over all blower speed settings of an HVAC system. At higher blower speed settings, it has been found that ions are not always delivered suitably to air flow in the HVAC system. In addition, other applications such as non-vehicle applications can be equipped with air ionization systems; similar challenges may be encountered in these non-vehicle applications.

Accordingly, one aim of the invention is to address the issues identified above, as well as address other possible issues that may arise.

SUMMARY OF THE INVENTION

Aspects and embodiments of the invention provide an ionized air delivery system such as a vehicle ionized air delivery system, a method of delivering ions to air flow in a duct of a heating, ventilation, and air conditioning (HVAC) system such as a duct of an HVAC system in a vehicle, and a vehicle as claimed in the appended claims.

According to an aspect of the invention, there is provided an ionized air delivery system. The ionized air delivery system may comprise an outlet body. The outlet body may be situated within a duct of a heating, ventilation, and air conditioning (HVAC) system in order to deliver ions to air flow in the duct of the HVAC system. The outlet body may have an outer surface that is exposed to the air flow in the duct of the HVAC system. The outer surface may be generally spherical at at least a region of the outer surface that confronts the air flow in the duct of the HVAC system. The outlet body may have an outlet passage therethrough for ion flow. The outlet passage may have an exit opening that is open to the duct of the HVAC system. The outlet passage may have a primary axis that is generally in-line with a direction of ion flow through the outlet passage. The primary axis may be directed away from an exit of the duct of the HVAC system.

In an embodiment of the invention the direction of the primary axis may be directed generally transverse to, and in an orthogonal relationship with, the direction of the air flow through the duct.

The skilled person would appreciate that the term generally spherical may relate to surfaces that are curved, elliptical and hemispherical, or to any other curved surface that provides a similar benefit to that of a generally spherical surface at a region of the outer surface that confronts the air flow in the duct of the HVAC system.

The ionized air delivery system, as described herein, may deliver ions to air flow in the duct of the HVAC system over all blower speed settings including higher blower speed settings of the HVAC system. A venturi effect may be experienced adjacent the exit opening of the outlet body, and the attendant decreased localized pressure acts to draw ions present in the outlet passage through the exit opening and to the air flow in the duct of the HVAC system. Ion flow reversal, which has been observed in previously-known ionized air delivery systems, may hence be precluded.

According to an embodiment of the invention, the outlet body may have a shape resembling a dome with a truncated upper portion. The generally spherical form of the outer surface may span around the dome-like shape. The exit opening may reside at the truncated upper portion. The dome-like shape may minimize obstruction to the air flow in the duct of the HVAC system, and the location of the exit opening may contribute to the venturi effect experienced.

According to an embodiment of the invention, the generally spherical form of the outer surface at the dome-like shape may extend to the exit opening and may terminate at the exit opening. Furthermore, the outer surface of the dome-like shape may lack a generally planar and non-spherical contour.

According to an embodiment of the invention, the air flow in the duct of the HVAC system passes across the exit opening of the outlet passage and draws ions out of the outlet passage to mix with the air flow in the duct of the HVAC system. The act of air flow passing across the exit opening may contribute to the venturi effect experienced at the exit opening.

According to an embodiment of the invention, the primary axis of the outlet passage may be directed generally transverse to a direction of the air flow in the duct of the HVAC system. And ions leaving the exit opening may be delivered generally transverse to the air flow in the duct of the HVAC system. This arrangement may contribute to the venturi effect experienced at the exit opening.

According to an embodiment of the invention, the outlet body may have a flange situated against an inside surface of the duct of the HVAC system. The flange may establish a seal against air flow leakage at the inside surface of the duct of the HVAC system.

According to an embodiment of the invention, a plane of the exit opening may be generally in parallel with a direction of the air flow in the duct of the HVAC system. Ions may be drawn out of the outlet passage via the air flow in the duct passing across the exit opening.

According to an embodiment of the invention, the outlet passage may be unidirectional throughout the outlet body.

According to an embodiment of the invention, the ionized air delivery system may include an ion generator and at least one ion delivery duct. The at least one ion delivery duct may communicate with the ion generator, and may communicate with the outlet body. Ions produced by the ion generator may flow through the at least one ion delivery duct and to the outlet body.

According to an aspect of the invention, the ionized air delivery system may be a vehicle ionized air delivery system.

According to an aspect of the invention, there is provided a vehicle that comprises the ionized air delivery system described herein.

According to an aspect of the invention, there is provided a method of delivering ions to air flow in a duct. The duct may be a duct of a vehicle heating, ventilation, and air conditioning (HVAC) system. The method may involve passing air flow in the duct of the vehicle HVAC system generally transverse to an exit opening of an outlet body of a vehicle ionized air delivery system. The method may also involve drawing ions out of the exit opening to mix with the air flow in the duct of the vehicle HVAC system. The ions drawn out of the exit opening may be delivered generally transverse to the air flow in the duct of the vehicle HVAC system. The method, as described, may deliver ions to air flow in the duct of the vehicle HVAC system over all blower speed settings including higher blower speed settings of the vehicle HVAC system. A venturi effect may be experienced adjacent the exit opening of the outlet body, and the attendant decreased localized pressure acts to draw ions present in the outlet body through the exit opening and to the air flow in the duct of the vehicle HVAC system. Ion flow reversal, which has been observed in previously-known ionized air delivery systems, may hence be precluded.

According to an embodiment of the invention, the method may involve the outlet body having an outer surface exposed to the air flow in the duct of the vehicle HVAC system. The outer surface may be generally spherical at at least a region of the outer surface that confronts the air flow in the duct of the HVAC system. The generally spherical form of the outer surface may minimize obstruction to the air flow in the duct of the HVAC system.

According to an embodiment of the invention, the method may involve the outlet body having an outlet passage therethrough for ion flow. The outlet passage may have a primary axis that may be generally in-line with a direction of ion flow through the outlet passage. The primary axis may be directed away from an exit of the duct of the vehicle HVAC system. This arrangement may contribute to the venturi effect experienced at the exit opening.

According to an embodiment of the invention, the method may involve the primary axis of the outlet passage being directed generally transverse to a direction of the air flow in the duct of the vehicle HVAC system. This arrangement may contribute to the venturi effect experienced at the exit opening.

According to an embodiment of the invention, the method may involve the outlet body having a shape resembling a dome with a truncated upper portion. The exit opening may reside at the truncated upper portion. The dome-like shape may minimize obstruction to the air flow in the duct of the vehicle HVAC system, and the location of the exit opening may contribute to the venturi effect experienced.

According to an embodiment of the invention, the method may involve the outlet body having a flange situated against an inside surface of the duct of the vehicle HVAC system. The flange may establish a seal against air flow leakage at the inside surface of the duct of the vehicle HVAC system.

According to an embodiment of the invention, the method may involve a plane of the exit opening being generally parallel with a direction of the air flow in the duct of the vehicle HVAC system. This arrangement may contribute to the venturi effect experienced at the exit opening.

According to an aspect of the invention there is provided an ionized air delivery system, comprising: a duct having a duct exit; and an outlet body situated within the duct and arranged to deliver ions to air flow A in the duct, the outlet body comprising an outlet passage therethrough for ion flow, an outlet exit open to the duct, and an outer surface having a generally spherical region R incident to the air flow A in the duct, wherein the outlet passage has an outlet direction OD directed away from the duct exit and coaxial to a primary ion flow direction.

Within the scope of this application it is expressly intended that the various aspects, embodiments, examples, and alternatives set out in the preceding paragraphs, in the claims, and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Referring to the drawings, an embodiment of a vehicle ionized air delivery system (hereafter in the detailed description "ionized air delivery system") 10 is depicted and will be detailed in this description. The ionized air delivery system 10 introduces ions into air flow in a duct of a vehicle heating, ventilation, and air conditioning (HVAC) system over all blower speed settings including higher blower speed settings which have presented issues in previous systems of the vehicle HVAC system. An outlet body of the ionized air delivery system 10 is designed, constructed, and arranged to promote the occurrence of a venturi effect at an exit opening of the outlet body. The attendant decrease in pressure at the exit opening serves to draw ions from the outlet body and into the air flow in the duct of the vehicle HVAC system. Ion flow reversal, which has been observed in previously-known outlet bodies, is therefore precluded in the ionized air delivery system 10. The term "vehicle" is meant to encompass all-electric automobiles, hybrid automobiles, and perhaps the more common internal combustion engine automobiles these types of automobiles include passenger cars, trucks, and sport utility vehicles (SUVs).

Figure 1:
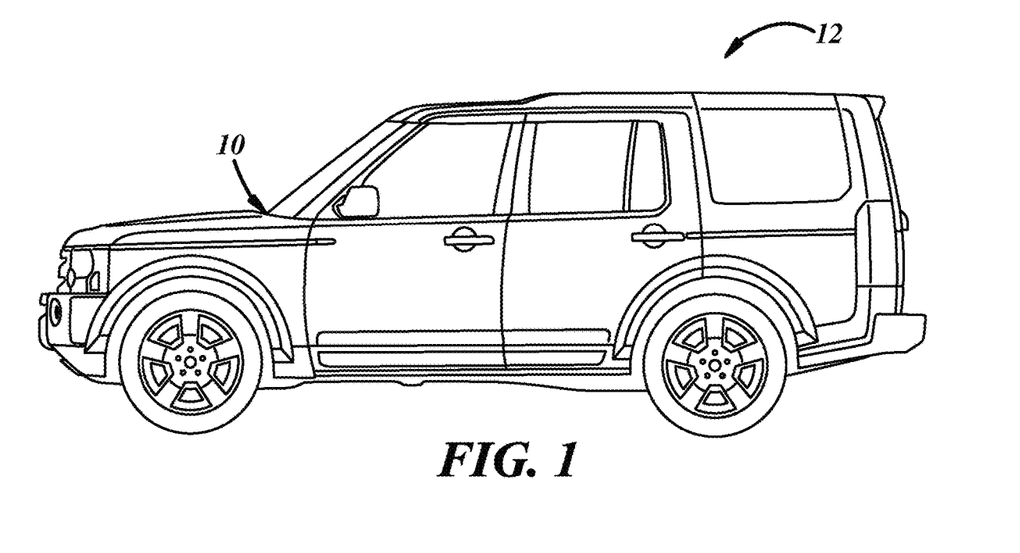
FIG. 1 is a schematic illustration of an embodiment of a vehicle comprising a vehicle ionized air delivery system in accordance with an embodiment of the invention.
Figure 2:
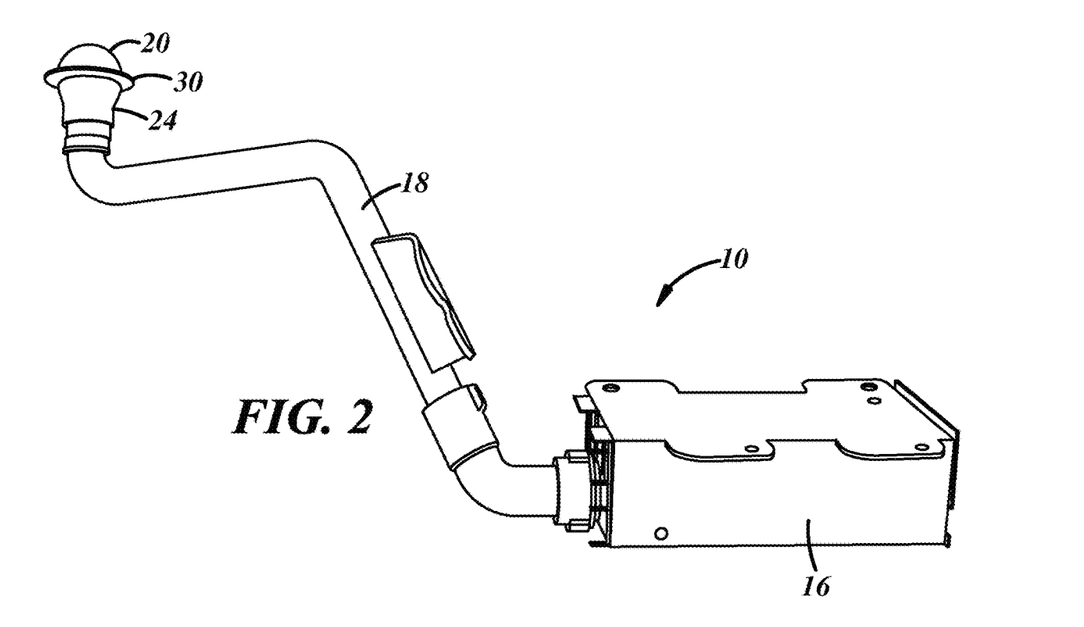
FIG. 2 illustrates a vehicle ionized air delivery system in accordance with an embodiment of the invention.
Figure 3:
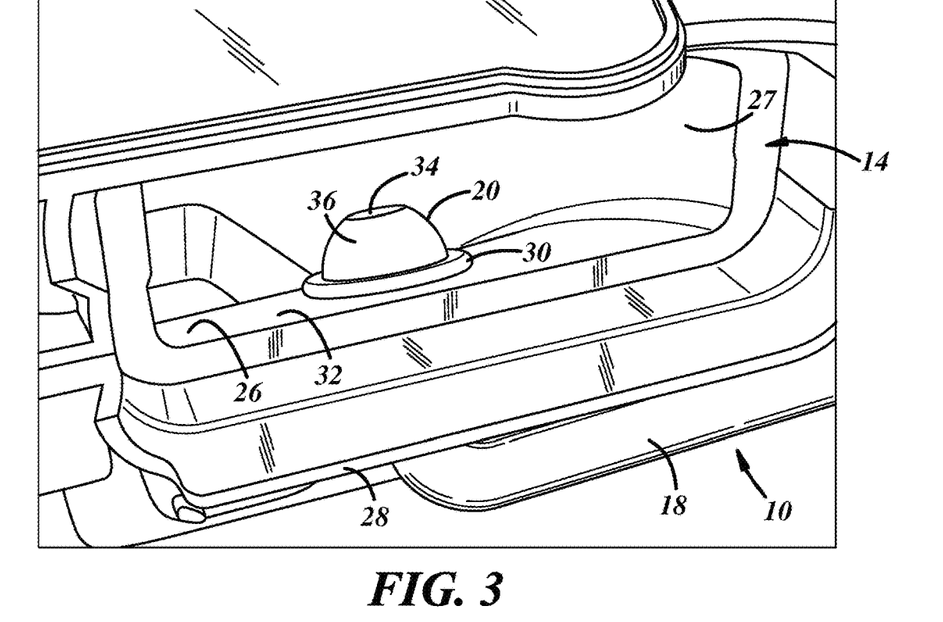
FIG. 3 illustrates an outlet body of the vehicle ionized air delivery system in accordance with an embodiment of the invention, the outlet body being shown installed in a vehicle heating, ventilation, and air conditioning (HVAC) system.
Figure 4:
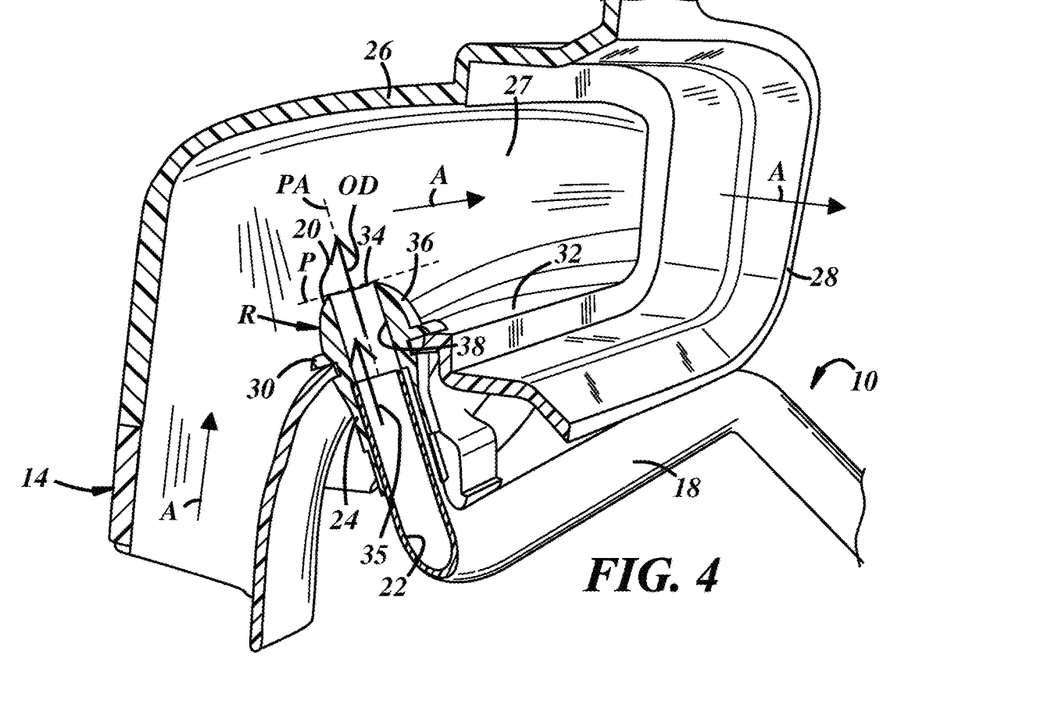
FIG. 4 illustrates a partial cross-sectional view of the outlet body of FIG. 3 in accordance with an embodiment of the invention.
Figure 5:
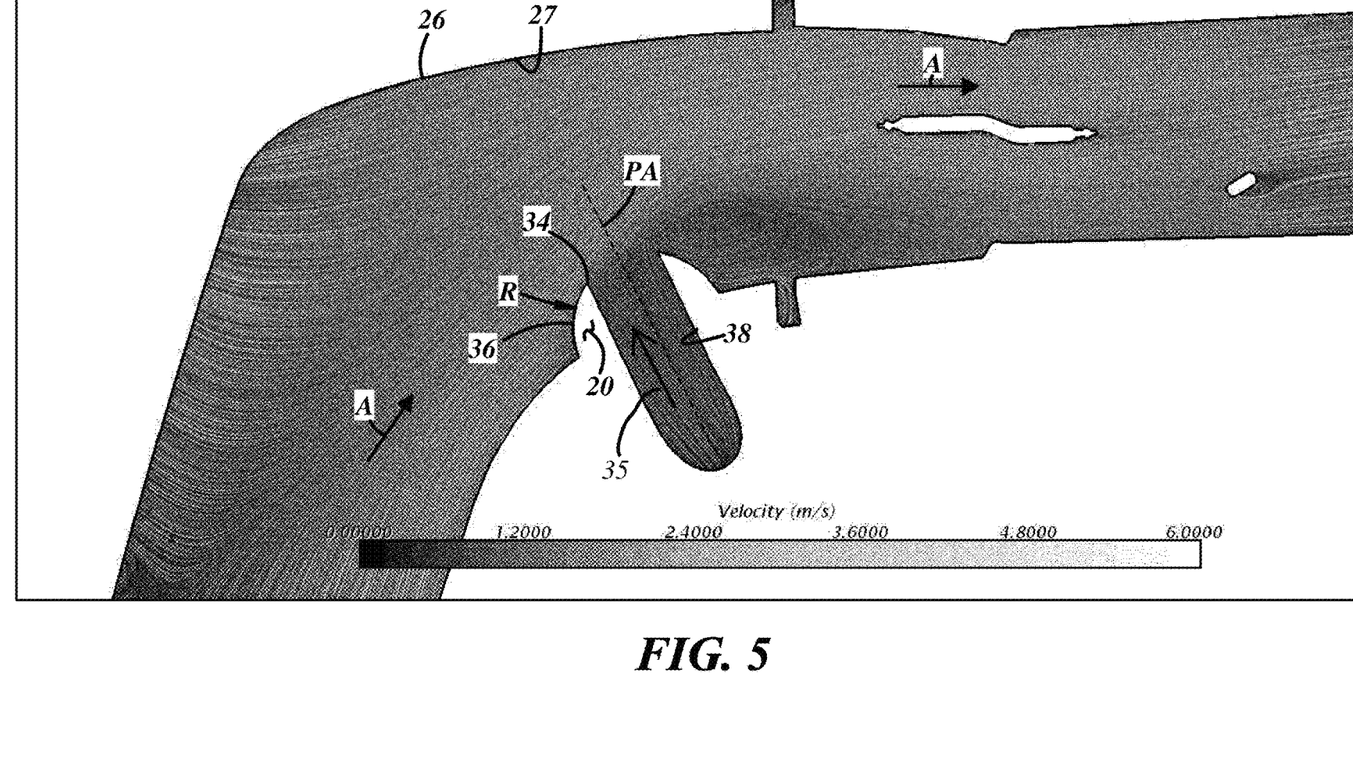
FIG. 5 is a depiction of simulated flow and velocity in the outlet body of FIG. 3 and in a duct of the vehicle HVAC system in accordance with an embodiment of the invention.

In general, the ionized air delivery system 10 can be equipped in a vehicle 12 like the one depicted in FIG. 1. While detailed in this description with reference to a vehicle application, the ionized air delivery system 10 can be equipped in other applications such as non-vehicle applications. In the example of the vehicle 12, the ionized air delivery system 10 produces ions for eventual delivery to a passenger compartment of the vehicle 12. Ion delivery may be integrated with an HVAC system 14 of the vehicle 12; an example HVAC system 14 is depicted in part in FIGS. 3 and 4. The ionized air delivery system 10 may have different designs, constructions, and components in different embodiments depending upon, among other possible influences, the application, the design and construction of the HVAC system such as the vehicle's HVAC system, packaging demands, and the extent of ion production and delivery desired. In the embodiment of FIGS. 2-4, the ionized air delivery system 10 includes an ion generator 16, one or more ion delivery ducts 18, and an outlet body 20. The ion generator 16 produces the ions to be delivered to the vehicle's passenger compartment. The ion delivery duct 18 fluidly communicates with the ion generator 16 and fluidly communicates with the outlet body 20. Ions produced by the ion generator 16 are conveyed through an ion delivery passage 22 (FIG. 4) of the ion delivery duct 18 and to the outlet body 20. Still further, the ionized air delivery system 10 could include other components such as an air mover to help propel ions through the ion delivery duct 18.

The outlet body 20 serves as an egress structure of the ionized air delivery system 10 to deliver ions directly to air flow in the HVAC system 14, which then conveys the ions to the vehicle's passenger compartment. The outlet body 20 may have different designs, constructions, and arrangements in different embodiments to carry out effective ion delivery. Its exact design, construction, and arrangement may depend on, among other possible factors, the location of the outlet body 20 within the HVAC system 14 and air flow behavior within the HVAC system 14 at the outlet body 20. In the embodiment presented by FIGS. 2-4, the outlet body 20 is secured over a terminal end of the ion delivery duct 18 via a sleeve 24 of the outlet body 20. The securement may be effected by a push fit or by another way. As illustrated by FIGS. 3 and 4, when installed, the outlet body 20 is situated within a duct 26 of the HVAC system 14. Air flow within a passage 27 of the duct 26 is generally represented in FIG. 4 by arrows A. The air flow A leaves the passage 27 at an exit 28 of the duct 26 to enter the vehicle's passenger compartment. The outlet body 20 is located upstream of the exit 28 relative to the direction of the air flow A. The air flow A is typically propelled through the duct 26 by an HVAC blower.

Furthermore, the outlet body 20 may have a flange 30. The flange 30 is shown seated directly against an inside surface 32 of the duct 26 in FIGS. 3 and 4. The flange 30, if provided, serves to seal against air flow leakage at the inside surface 32 of the duct 26, and may raise the non-flanged and main portion of the outlet body 20 vertically higher into the air flow A within the duct 26 where the outlet body 20 may have greater exposure to the air flow A. The flange 30 may have different dimensions. In specific examples, the flange 30 may have a diameter of approximately twenty-eight (28) millimeters (mm) and a height of approximately three (3) mm; of course, in other examples other dimensions are possible.

Unlike the outlet body 20 of the figures, previously-known outlet bodies in past ionized air delivery systems had a periscope-like shape. The periscope-like outlet bodies had a single elbow turn along their extents that aimed their exits directly at an HVAC duct exit. In other words, ions would leave the periscope-like outlet bodies generally in-line with, and in the direction of, air flow in the accompanying HVAC duct. The periscope-like outlet bodies were for the most part effective at delivering ions to the HVAC air flow at lower blower speed settings. But at higher blower speed settings, issues with ion delivery have been observed in some ionized air delivery systems. The periscope-like arrangement and the higher air flow speeds have caused a condition in which the direction of ion flow reverses within the outlet bodies. Instead of being delivered to the HVAC air flow, ions would consequently remain within the periscope-like outlet bodies.

To resolve these issues, the outlet body 20 possesses certain designs, constructions, and arrangements that promote ready delivery of ions to air flow in the HVAC system 14 over all blower speed settings (e.g., low to high settings) of the HVAC system 14. The designs, constructions, and arrangements create a venturi effect near the outlet body 20 that draws ions out of the outlet body 20 even at higher blower speed settings, instead of keeping the ions in the outlet body as may occur in past ionized air delivery systems. The venturi effect causes a localized pressure reduction at an exit opening 34 of the outlet body 20, and the decreased pressure pulls ions out of the outlet body 20 and into the air flow A within the duct 26. Ion flow in the outlet body 20 and ion delivery passage 22 has a primary ion flow direction 35.

Still referring to FIGS. 3 and 4, the outlet body 20 may have a generally dome shape with a truncated upper portion. The truncated upper portion is established by removing a top side of a fully intact dome shape. In this embodiment, the exit opening 34 resides at the truncated upper portion. An outer surface 36 of the outlet body 20 is generally spherical in form and spans around the generally dome shape of the outlet body 20. Here, the generally spherical form extends up to the exit opening 34 and the outlet body 20 lacks planar surfaces at its generally dome shape. In other embodiments, however, one or more planar surfaces could be provided at the outer surface 36. Indeed, the generally spherical form of the outer surface 36 could be established in part or more by an arrangement of many small and somewhat planar and neighboring surfaces. Still, in other embodiments the generally spherical form could only be present at a region R (FIG. 4) of the outer surface 36 that directly confronts the air flow A in the duct 26, and need not extend all the way around the outlet body 20. Other embodiments, in this regard, could have shapes other than domes with truncated upper portions as shown in the figures. Having the generally spherical form at at least the region R contributes to the creation of the venturi effect that draws ions out of the exit opening 34. The form of the outer surface 36 opposite the region R and at a non-confrontational and downstream side of the outlet body 20, on the other hand, could have a shape other than spherical; for instance, it could have a tapered shape. Whatever the exact shape of the outlet body 20, the generally spherical form of the outer surface 36 at the region R serves to increase the speed of the air flow A across and over the exit opening 34 compared to the previously-known outlet bodies, and minimizes obstruction to the air flow A as the air flow A travels through the passage 27 of the duct 26 and as the air flow A encounters the outlet body 20. Further, the generally dome shape provides easy installation, as any rotational position of the outlet body 20 as it is being seated in the duct 26 will result in a generally spherical form in direct confrontation with the air flow A.

In the embodiment in which the outlet body 20 has the generally dome shape, the dome may be designed with different dimensions. In specific examples, a diameter taken at base of the dome and immediately above the flange 30 may be approximately twenty (20) mm, twenty-six (26) mm, or twenty-eight (28) mm; of course, in other examples other dimensions are possible.

The arrangement of the exit opening 34 at the truncated upper portion may also contribute to the creation of the venturi effect that draws ions out of the outlet body 20. Referring in particular to FIG. 4, a plane P of the exit opening 34 may have a generally parallel relationship with respect to the direction of travel of the air flow A adjacent the outlet body 20. The plane P lies radially across the exit opening 34 ("radially" is used relative to a generally circular cross-sectional profile of the exit opening 34), and lies generally orthogonal to a direction of ion flow through the outlet body 20. As depicted in FIG. 4, the plane P resides mostly in-line with the air flow A travelling above the outlet body 20, but need not be precisely parallel to the direction of travel of the air flow A, as the air flow A may not necessarily travel linearly as it makes its way through the duct 26. By this arrangement, the air flow A more readily speeds across and over the exit opening 34 compared to previously-known outlet bodies. This is believed to contribute to the creation of the venturi effect that draws ions out of the outlet body 20.

Ions travel through the outlet body 20 by way of an outlet passage 38. The outlet passage 38 fluidly communicates with the ion delivery passage 22 and conveys ions to the exit opening 34. Referring again particularly to FIG. 4, the outlet passage 38 in this embodiment is uni-directional and lacks a turn in its full axial extent ("axial" is used relative to a generally cylindrical shape of the outlet passage 38). The uni-directional extent compared to the elbow turn of the previously-known periscope-like outlet bodies more readily ensures that ions indeed make their way to the air flow A since the uni-directional extent minimizes potential surface abutment and interaction with ions. In this regard too, the length of the total axial extent of the outlet passage 38 is less than that of the previously-known periscope-like outlet body, again minimizing the potential surface abutment and interaction with ions. An outlet direction OD of the outlet passage 38 is coaxial to the primary ion flow direction 35.

Figure 6:
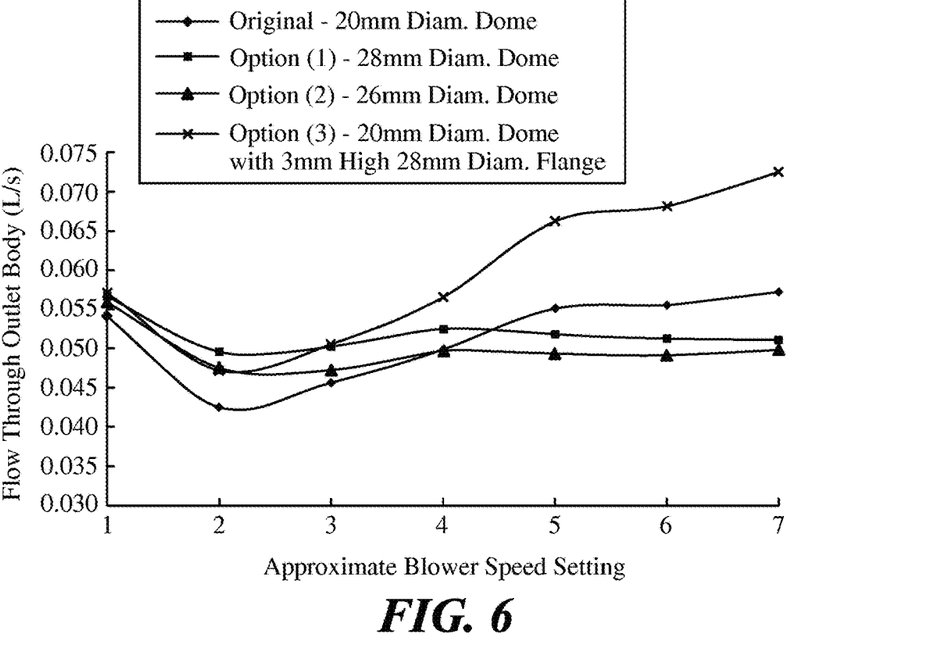
FIG. 6 is a graph presenting simulated results, with approximate blower speed settings on the x-axis and volumetric flow rate through the outlet body in liters per second (L/s) on the y-axis.
Figure 7:
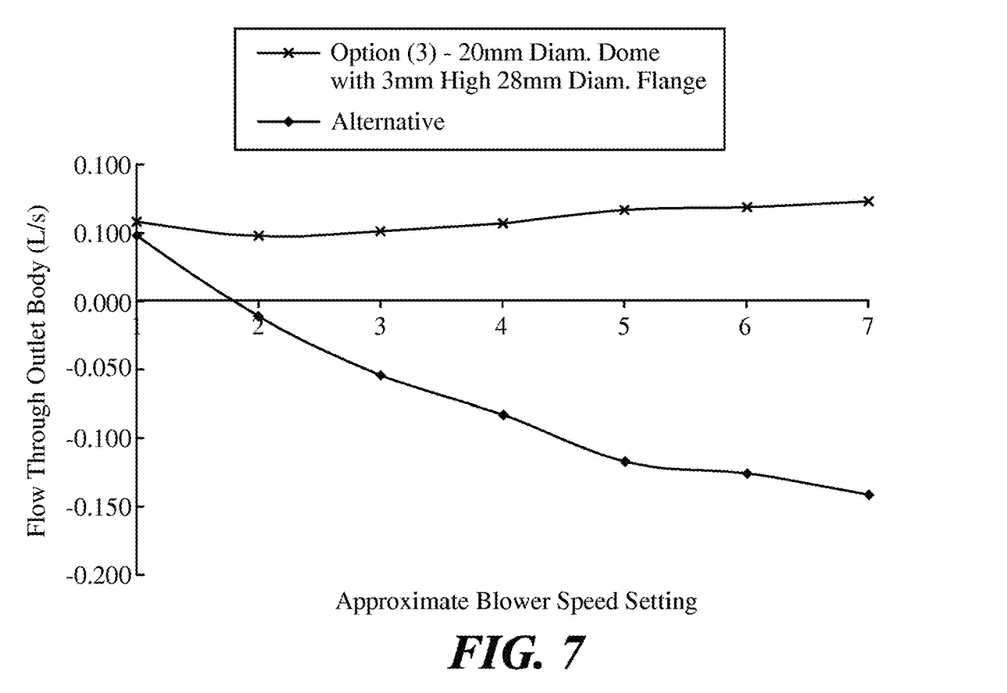
FIG. 7 is a graph presenting simulated results, with approximate blower speed settings on the x-axis and volumetric flow rate through the outlet body in liters per second (L/s) on the y-axis.

Furthermore, the outlet passage 38 has a primary axis PA defined therethrough and generally parallel to, and in-line with, ion flow traveling through the outlet passage 38. As illustrated in FIG. 4, the primary axis PA is directed away from the duct's exit 28 this differs from the previously-known periscope-like outlet bodies which aimed their exits directly at HVAC duct exits. In the embodiment of the figures, the primary axis PA is directed generally transverse to, and in an orthogonal relationship with, the direction of the air flow A through the duct 26. Ions leaving the exit opening 34 are therefore delivered in a generally transverse and generally perpendicular relationship with the direction of the air flow A. Still, in other embodiments the primary axis PA could have other directions and relationships relative to the direction of the air flow A. Further, and as demonstrated by FIG. 4, the primary axis PA intersects the plane P of the exit opening 34 at a right angle. As described, these arrangements alone or in combination may contribute to the creation of the venturi effect that draws ions out of the exit opening 34. In some embodiments the outlet direction OD is coaxial to the primary axis PA. Similarly, therefore, the outlet direction OD may be directed away from the duct exit 28.

FIG. 5 depicts simulated flow and velocity of the air flow A through the passage 27 of the duct 26, and depicts simulated flow and velocity of ion flow through the outlet passage 38 of the outlet body 20. The simulations were produced via computational fluid dynamics (CFD) software; other simulations may produce other flows and velocities of air flow and ion flow. Referring to FIG. 5, the air flow A confronting and encountering the region R of the outer surface 36 readily flows past the region R and speeds and accelerates across and over the exit opening 34. Ion flow is pulled through the outlet passage 38 and into the stream of the air flow A and downstream to the exit 28 of the duct 26.

FIG. 6 is a graph presenting simulated results of volumetric flow rate of ion flow through the outlet passage 38 of the outlet body 20 over a full range of HVAC blower speed settings. The simulated results were produced via CFD software; other simulations may produce other results. The x-axis of the graph in FIG. 6 presents approximate blower speed settings 1 to 7. Speed setting 1 constitutes the lowest blower speed setting in the vehicle 12, and speed setting 7 constitutes the highest blower speed setting in the vehicle 12. In this example simulation, speed setting 1 gives a volumetric flow rate of the air flow A through the accompanying HVAC system of approximately forty (40) liters per second (L/s); speed setting 2 gives a volumetric flow rate of the air flow A through the accompanying HVAC system of approximately sixty-one (61) L/s; speed setting 3 gives a volumetric flow rate of the air flow A through the accompanying HVAC system of approximately eighty (80) L/s; speed setting 4 gives a volumetric flow rate of the air flow A through the accompanying HVAC system of approximately ninety-six (96) L/s; speed setting 5 gives a volumetric flow rate of the air flow A through the accompanying HVAC system of approximately one-hundred-and-fifteen (115) L/s; speed setting 6 gives a volumetric flow rate of the air flow A through the accompanying HVAC system of approximately one-hundred-and-twenty (120) L/s; and speed setting 7 gives a volumetric flow rate of the air flow A through the accompanying HVAC system of approximately one-hundred-and-twenty-nine (129) L/s. In this example simulation, the volumetric flow rate of the air flow A through the duct 26 would be approximately twenty percent (20%), or approximately one-fifth, of the volumetric flow rate of the air flow A through the accompanying HVAC system. The y-axis of the graph in FIG. 6 presents volumetric flow rate in L/s of ion flow through the outlet passage 38 of the outlet body 20.

The graph of FIG. 6 demonstrates the simulated results of four outlet bodies 20 having a generally dome shape with a truncated upper portion like that of FIGS. 3 and 4. The outlet bodies 20 labeled "Original," "Option (1)," and "Option (2)" lacked a flange like the flange 30. And the outlet body 20 labeled "Option (3)" had a flange 30 as described in connection with FIGS. 3 and 4. The simulated results illustrate that all of the outlet bodies "Original," "Option (1)," "Option (2)," and "Option (3)" exhibited positive volumetric flow rates across all of the blower speed settings 1 to 7. Indeed, the outlet bodies 20 "Original" and "Option (3)" exhibited an increase in volumetric flow rate at higher blower speed settings.

FIG. 7 is a graph presenting simulated results of volumetric flow rate of ion flow over the full range of HVAC blower speed settings. The simulated results were produced via CFD software; other simulations may produce other results. The x-axis of the graph in FIG. 7 presents the approximate blower speed settings 1 to 7 as described above for the graph in FIG. 6. And the y-axis of the graph in FIG. 7 presents volumetric flow rate in L/s of ion flow through outlet passages of different outlet bodies. The outlet body 20 labeled "Option (3)" in FIG. 7 had a generally dome shape with a truncated upper portion and a flange 30, similarly as described in connection with FIGS. 3 and 4. The outlet body labeled "Alternative," on the other hand, was the previously-known periscope-like outlet body with the single elbow turn, as described above. The simulated results illustrate that the outlet body labeled "Alternative" exhibits negative volumetric flow rates at blower speed settings 2 to 7 this is the condition described above in which the direction of ion flow reverses within the periscope-like outlet body. In contrast, the simulated results illustrate that the outlet body labeled "Option (3)" exhibits positive volumetric flow rates across all of the blower speed settings 1 to 7.

Figure 8:
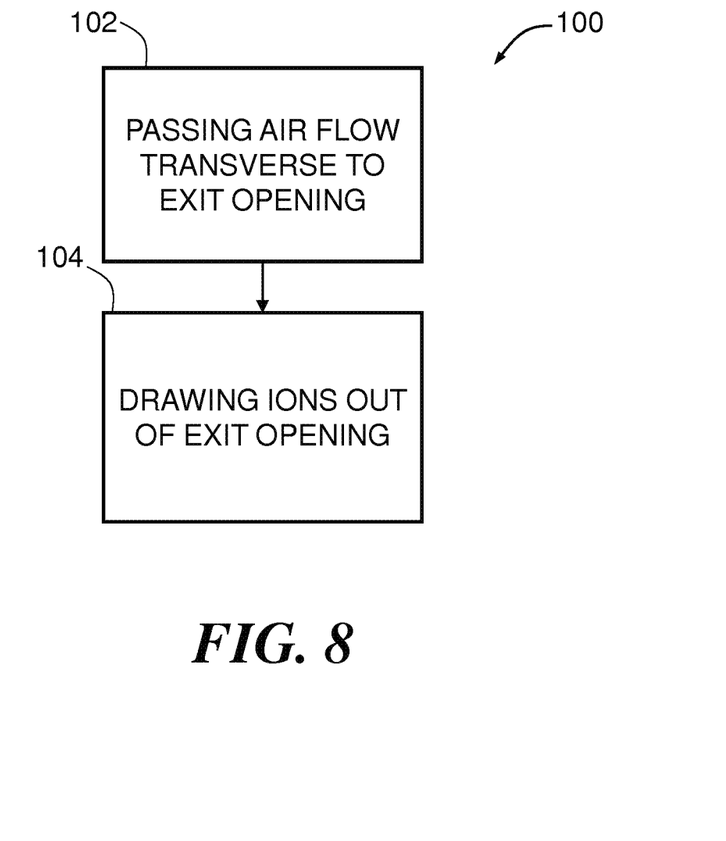
FIG. 8 is a flow chart representation of a method of delivering ions to air flow in a duct of a vehicle heating, ventilation, and air conditioning (HVAC) system in accordance with an embodiment of the invention.

FIG. 8 is a flow chart representation of an embodiment of a method 100 of delivering ions to the air flow A in the duct 26 of the HVAC system 14. The method 100 may involve passing the air flow A in the duct 26 generally transverse to the exit opening 34 of the outlet body 20 (numeral 102). The air flow A may be passed, as previously described, by the HVAC blower. The method 100 may also involve drawing ions out of the exit opening 34 in order to mix with the air flow A in the passage 27 of the duct 26 (numeral 104). The ions may be drawn out of the exit opening 34 by employing one or more of the various designs, constructions, and arrangements described above for the outlet body 20. Other embodiments of the method 100 could involve additional, fewer, and/or different actions than described here.

Lastly, it should be appreciated that the various designs, constructions, and arrangements described above for the outlet body 20 could be omitted and/or combined with other designs, constructions, and arrangements in other embodiments of the outlet body 20, while still achieving effective introduction of ions over all blower speed settings. For instance, the primary axis PA of the outlet passage 38 need not necessarily be directed transverse to the direction of air flow A in the duct 26, the plane P of the exit opening 34 need not necessarily be oriented in parallel with the direction of air flow A in the duct 26, and/or the primary axis PA need not necessarily be directed away from the duct's exit 28.

It will be understood that the embodiments described above are given by way of example only and are not intended to limit the invention, the scope of which is defined in the appended claims. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An ionized air delivery system, comprising:
an outlet body situated within a duct of a heating, ventilation, and air conditioning (HVAC) system in order to deliver ions to air flow A in the duct of the HVAC system, said outlet body having an outer surface exposed to the air flow A in the duct of the HVAC system, said outlet body having an outlet passage therethrough for ion flow wherein at least part of said outlet passage is contained within a portion of said outlet body that is situated within the duct of the HVAC system, said outlet passage having an exit opening that is open to the duct of the HVAC system, said outlet passage having a primary axis PA that is generally in-line with a direction of ion flow through said outlet passage wherein a plane P of said exit opening is generally in parallel with a direction of the air flow A in the duct of the HVAC system, and ions are drawn out of said outlet passage via the air flow A in the duct passing across said exit opening, wherein the portion of said outlet body situated within the duct of the HVAC system is a dome with a truncated upper portion, said exit opening being defined by the truncated upper portion of the dome, wherein the truncated dome has an outer surface including a region R that confronts the air flow A in the duct of the HVAC system.

2. The ionized air delivery system of claim 1, wherein said ion flow from the outlet body is directed away from an exit of the duct of the HVAC system.

3. The ionized air delivery system of claim 1, wherein said primary axis PA of said outlet passage is directed generally transverse to a direction of the air flow A in the duct of the HVAC system, and ions leaving said exit opening are delivered generally transverse to the direction of the air flow A in the duct of the HVAC system.

4. The ionized air delivery system of claim 1, wherein the outer surface extends to said exit opening and terminates at said exit opening.

5. The ionized air delivery system of claim 1, wherein said outer surface lacks a generally planar contour.

6. The ionized air delivery system of claim 1, wherein the air flow A in the duct of the HVAC system passes across said exit opening of said outlet passage and draws ions out of said outlet passage to mix with the air flow A in the duct of the HVAC system.

7. The ionized air delivery system of claim 1, wherein said outlet body has a flange situated against an inside surface of the duct of the HVAC system, said flange establishing a seal against air flow leakage at the inside surface.

8. The ionized air delivery system of claim 1, wherein said outlet passage is unidirectional throughout said outlet body.

9. The ionized air delivery system of claim 1, comprising an ion generator and at least one ion delivery duct communicating with said ion generator and communicating with said outlet body, ions produced by said ion generator flow through said at least one ion delivery duct to said outlet body.

10. The ionized air delivery system of claim 1, wherein the ionized air delivery system is a vehicle ionized air delivery system.

11. A vehicle comprising the ionized air delivery system of claim 1.

12. A method of delivering ions to air flow A in a duct of a vehicle heating, ventilation, and air conditioning (HVAC) system, the method comprising:

passing the air flow A in the duct of the vehicle HVAC system generally transverse to an exit opening of an outlet body of a vehicle ionized air delivery system, wherein said outlet body has an outer surface and an outlet passage therethrough for ion flow wherein at least part of the outlet passage is contained within a portion of said outlet body and is situated within the duct of the HVAC system, wherein the portion of said outlet body situated within the duct of the HVAC system is a dome with a truncated upper portion, said exit opening being defined by the truncated upper portion of the dome, wherein the truncated dome has an outer surface including a region R that confronts the air flow A in the duct of the HVAC system, and drawing ions out of said exit opening to mix with the air flow A in the duct of the vehicle HVAC system.

13. The method of delivering ions to air flow A in a duct of a vehicle HVAC system of claim 12, wherein said outlet passage has a primary axis PA that is generally in-line with a direction of ion flow through said outlet passage, said primary axis PA being directed away from an exit of the duct of the vehicle HVAC system.

14. The method of delivering ions to air flow A in a duct of a vehicle HVAC system of claim 13, wherein said primary axis PA of said outlet passage is directed generally transverse to a direction of the air flow A in the duct of the vehicle HVAC system.

15. The method of delivering ions to air flow A in a duct of a vehicle HVAC system of claim 12, wherein said outlet body has a flange situated against an inside surface of the duct of the vehicle HVAC system, said flange establishing a seal against air flow leakage at the inside surface.

16. The method of delivering ions to air flow A in a duct of a vehicle HVAC system of claim 12, wherein a plane P of said exit opening is generally parallel with a direction of the air flow A in the duct of the vehicle HVAC system.

17. An ionized air delivery system, comprising:

a duct having a duct exit; and an outlet body situated within the duct and arranged to deliver ions to air flow A in the duct, the outlet body comprising an outlet passage therethrough for ion flow, an outlet exit open to the duct, wherein at least part of the outlet passage of the outlet body is contained within a portion of the outlet body that is situated within the duct, wherein the portion of said outlet body situated within the duct of the HVAC system is a dome with a truncated upper portion, said exit opening being defined by the truncated upper portion of the dome, wherein the truncated dome has an outer surface including a region R that confronts the air flow A in the duct of the HVAC system, and further wherein the outlet passage has an outlet direction OD coaxial to a primary ion flow direction in the outlet passage.

18. An ionized air delivery system as claimed in claim 17, wherein the duct is a duct of a heating, ventilation, and air conditioning (HVAC) system.

* * * * *